US012793622B2

(12) United States Patent
Ok et al.

(10) Patent No.: US 12,793,622 B2
(45) Date of Patent: Nov. 10, 2026

(54) DISPLAY APPARATUS AND CONTROLLING METHOD THEREOF

(71) Applicant: Samsung Electronics Co., Ltd., Suwon-si (KR)

(72) Inventors: Sungook Ok, Suwon-si (KR); Sangwon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/270,921

(22) Filed: Jul. 16, 2025

(65) Prior Publication Data

US 2026/0065848 A1 Mar. 5, 2026

Related U.S. Application Data

(63) Continuation of application No. PCT/KR2025/008490, filed on Jun. 19, 2025.

(30) Foreign Application Priority Data

Aug. 28, 2024 (KR) ........................ 10-2024-0116118

(51) Int. Cl.
*G09G 3/32* (2016.01)
*G09G 3/20* (2006.01)

(52) U.S. Cl.
CPC ............. *G09G 3/32* (2013.01); *G09G 3/2096* (2013.01); *G09G 2300/026* (2013.01); (Continued)

(58) Field of Classification Search
CPC .. G09G 3/32; G09G 3/2096; G09G 2300/026; G09G 2320/0626; G09G 2320/0693; G09G 2330/04; G09G 2356/00
See application file for complete search history.

(56) References Cited

U.S. PATENT DOCUMENTS 9,477,438 B1 10/2016 Hochman et al.
9,777,917 B2 10/2017 Johansen
(Continued)

FOREIGN PATENT DOCUMENTS

CN 111312157 A 6/2020
KR 10-2017-0019632 2/2017
(Continued)

OTHER PUBLICATIONS

International Search Report and Written Opinion dated Sep. 23, 2025, in PCT Application No. PCT/KR2025/008490.

*Primary Examiner* — Peter D Mcloone
(74) *Attorney, Agent, or Firm* — STAAS & HALSEY LLP

(57) ABSTRACT

A display apparatus is disclosed. The display apparatus includes a plurality of displays, a memory storing at least one instruction, and at least one processor configured to execute the at least one instruction to, based on the display apparatus being activated, identify based on module data respectively corresponding to the plurality of displays and initial setting data whether there is at least one display of the plurality of displays that is a replacement display that was replaced before the display apparatus was activated, based on identifying that there is at least one display that is a replacement display, obtain a dehumidifying mode for dehumidifying each display of the at least one display that was replaced based on the module data corresponding to the display, and control each display of the at least one display that was replaced to operate in the dehumidifying mode obtained for the display.

15 Claims, 11 Drawing Sheets

(52) U.S. Cl.
CPC . *G09G 2320/0693* (2013.01); *G09G 2330/04* (2013.01); *G09G 2356/00* (2013.01)

(56) References Cited

U.S. PATENT DOCUMENTS

| | | | | |
|---|---|---|---|---|
| 10,712,992 | B2 * | 7/2020 | Seo | G06F 3/1446 |
| 10,853,018 | B2 | 12/2020 | Kim et al. | |
| 11,057,666 | B2 * | 7/2021 | Park | G09G 3/006 |
| 11,432,383 | B2 * | 8/2022 | Hyeon | G06F 3/1446 |
| 11,615,217 | B2 | 3/2023 | Deng et al. | |
| 2017/0110036 | A1 | 4/2017 | Hall | |
| 2019/0384560 | A1 * | 12/2019 | Seo | G09F 9/3026 |
| 2020/0221166 | A1 * | 7/2020 | Park | G06F 3/044 |
| 2022/0191986 | A1 * | 6/2022 | Hyeon | G09G 3/32 |
| 2025/0104618 | A1 | 3/2025 | Kim et al. | |

FOREIGN PATENT DOCUMENTS

| | | |
|---|---|---|
| KR | 10-2017-0037485 | 4/2017 |
| KR | 10-2019-0141384 | 12/2019 |
| KR | 10-2020-0036408 | 4/2020 |
| KR | 10-2265975 | 6/2021 |
| KR | 10-2022-0085614 | 6/2022 |
| KR | 10-2023-0171722 | 12/2023 |

* cited by examiner

FIG. 7

20

| STORAGE PERIOD | DEHUMIDIFYING MODE | DEHUMIDIFYING OPERATION |
|---|---|---|
| LESS THAN 5 YEARS | FIRST MODE | 1) PRE-HEATING (LOW BRIGHTNESS→HIGH BRIGHTNESS (TOTAL 10 STEPS, 2 HOURS PER STEP))<br>2) AGING PATTERN (120 HOURS, FULL-WHITE (2 HOURS)/BLACK (1 HOUR)) |
| 5 YEARS OR MORE | SECOND MODE | 1) PRE-HEATING (LOW BRIGHTNESS→HIGH BRIGHTNESS (TOTAL 11 STEPS, 4 HOURS PER STEP))<br>2) AGING PATTERN (120 HOURS, FULL-WHITE (2 HOURS)/BLACK (1 HOUR)) |

DISPLAY APPARATUS AND CONTROLLING METHOD THEREOF

CROSS-REFERENCE TO RELATED APPLICATION(S)

This application is a continuation application, claiming priority under 35 U.S.C. § 365(c), of an International application No. PCT/KR2025/008490, filed on Jun. 19, 2025, which is based on and claims the benefit of a Korean patent application number 10-2024-0116118, filed on Aug. 28, 2024, in the Korean Intellectual Property Office, the disclosure of which is incorporated by reference herein in its entirety.

TECHNICAL FIELD

The disclosure relates to a display apparatus and a controlling method thereof, and more particularly to a display apparatus that dehumidifies a replaced display from among a plurality of displays included in the display apparatus and a controlling method thereof.

BACKGROUND ART

Recently, use of modular display apparatuses that provide display screens by combining a plurality of LED display modules is increasing.

While using a modular display apparatus as described above, there may be instances where a module defect occurs and replacement thereof is necessary. In this case, when replacing to a module that was being stored, dehumidification of the replaced module may be necessary based on a state of location at which the module was being stored.

To this end, in the related art, there has been a problem of having to execute a dehumidifying mode manually through a TCON board of the modular display apparatus using JIG and S/W program, and the like. In addition, after replacing the module, if a screen immediately turned-on mistakenly by a worker or a user without manually executing the dehumidifying mode, overheating of the screen or the like may occur. In this case, a defect in the module may occur due to the modular display apparatus being operated in a normal mode without moisture in the module being removed.

Accordingly, there is a growing demand for technology which can automatically identify whether to replace a module constituting the modular display apparatus, and automatically execute the dehumidifying mode.

DISCLOSURE

Technical Solution

According to an embodiment of the disclosure, a display apparatus includes a plurality of displays, a memory storing at least one instruction. The at least one processor may be configured to execute the at least one instruction to, based on the display apparatus being activated, identify, based on module data respectively corresponding to the plurality of displays and initial setting data whether there is at least one display of the plurality of displays that is a replacement display that was replaced before the display apparatus was activated, based on identifying that there is at least one display that is a replacement display, obtain a dehumidifying mode for dehumidifying each display of the at least one display that is a replacement display based on the module data corresponding to the display, and control each display of the at least one display that is a replacement display to operate in the dehumidifying mode obtained for the display.

The at least one processor may be configured to compare the initial setting data with the module data corresponding to each display of the plurality of displays, identify module data corresponding to at least one display of the plurality of displays that is different from the initial setting data, and identify the at least one display having corresponding module data that is different from the initial setting data as the at least one display that is a replacement display.

The initial setting data includes first calibration data for correcting at least one parameter corresponding to each of the plurality of displays. The module data corresponding to each display of the plurality of displays includes second calibration data for correcting the at least one parameter. The at least one processor may be configured to compare the first calibration data with the second calibration data included in the module data corresponding to each display of the plurality of displays, identify second calibration data included in the module data corresponding to at least one display of the plurality of displays as different from the first calibration data, and identify the at least one display having corresponding module data including second calibration data that is different from the first calibration data as the at least one display that is a replacement display.

The first calibration data includes a plurality of bits, and the plurality of bits included in the first calibration data includes at least one first bit to identify whether a display is a replacement display. The second calibration data included in the module data corresponding to each display of the plurality of displays includes a plurality of bits, and the plurality of bits included in the second calibration data includes at least one second bit positioned at a same bit position as the at least one first bit. The at least one processor may be configured to compare the at least one first bit with the at least one second bit included in the second calibration data included in the module data corresponding to each display of the plurality of displays, identify the at least one first bit and the at least one second bit included in the second calibration data included in the module data corresponding to at least one display of the plurality of displays as being different, and identify the at least one display having corresponding module data including second calibration data including the at least one second bit that is different than the at least one first bit as the at least one display that is a replacement display.

The at least one processor may be configured to, based on a dehumidifying operation corresponding to the dehumidifying mode for dehumidifying a display of the at least one display that is a replacement display being completed, update the at least one second bit included in the second calibration data included in the module data corresponding to the display identically as the at least one first bit.

The at least one processor may be configured to, based on identifying that there is at least one display that is a replacement display, obtain the dehumidifying mode for dehumidifying each display of the at least one display that is a replacement display based on manufacturing date data included in the module data corresponding to the display.

The at least one processor may be configured to identify a storage period for each display of the at least one display that is a replacement display based on a current date and the manufacturing date data included in the module data corresponding to the display, and obtain a mode for each display of the at least one display that is a replacement display corresponding to the storage period for the display as the dehumidifying mode for the display.

The dehumidifying mode for each display of the at least one display that is a replacement display is one dehumidifying mode from among a plurality of dehumidifying modes for the display, the plurality of dehumidifying modes for each display divided based on at least one predetermined period. The at least one processor may be configured to obtain the dehumidifying mode for each display of the at least one display that is a replacement display by comparing the storage period for the display with the at least one predetermined period.

The at least one processor may be configured to, based on identifying that there is at least one display that is a replacement display, while a display of the at least one display is operating in the dehumidifying mode obtained for the display, deactivate at least one remaining display of the plurality of displays excluding the at least one display that is a replacement display.

The at least one processor may be configured to control at least one remaining display of the plurality of displays excluding the at least one display that is a replacement display to display progress information of the dehumidifying mode of each display of the at least one display that is a replacement display.

According to an embodiment, a controlling method of a display apparatus including a plurality of displays includes based on the display apparatus being activated, identifying, based on module data respectively corresponding to the plurality of displays and initial setting data, whether there is at least one display of the plurality of displays that is a replacement display that was replaced before the display apparatus was activated, based on identifying that there is at least one display that is a replacement display obtaining a dehumidifying mode for dehumidifying each display of the at least one display that is a replacement display based on module data corresponding to the display, and controlling each display of the at least one display that is a replaced display to operate in the dehumidifying mode obtained for the display.

The identifying whether there is at least one display of the plurality of displays that is a replacement display that was replaced before the display apparatus is activated may include comparing the initial setting data with the module data corresponding to each display of the plurality of displays, identifying module data corresponding to at least one display of the plurality of displays that is different from the initial setting data, and identifying the at least one display having corresponding module data that is different from the initial setting data as the at least one display that is a replacement display.

The initial setting data includes first calibration data for correcting at least one parameter corresponding to each of the plurality of displays. The module data corresponding to each display of the plurality of displays may include second calibration data for correcting the at least one parameter corresponding to each display of the plurality of displays. The identifying the at least one display having corresponding module data that is different from the initial setting data as the at least one display that is a replacement display may include comparing the first calibration data with second calibration data included in the module data corresponding to each display of the plurality of displays, identifying second calibration data included in the module data corresponding to at least one display of the plurality of displays as different from the first calibration data, and identifying the at least one display having corresponding module data including second calibration data that is different from the first calibration data as the at least one display that is a replacement display.

The first calibration data may include a plurality of bits, and the plurality of bits included in the first calibration data may include at least one first bit to identify whether a display is a replacement display. The second calibration data included in the module data corresponding to each display of the plurality of displays may include a plurality of bits, and the plurality of bits included in the second calibration data may include at least one second bit positioned at a same bit position as the at least one first bit. The identifying the at least one display having corresponding module data including second calibration data that is different from the first calibration data as the at least one display that is a replacement display may include comparing the at least one first bit with the at least one second bit included in the second calibration data included in the module data corresponding to each display of the plurality of displays, identifying the at least one first bit and the at least one second bit included in the second calibration data included in the module data corresponding to at least one display of the plurality of displays as being different, and identifying the at least one display having corresponding module data including second calibration data including the at least one second bit that is different than the at least one first bit as the at least one display that is a replacement display.

Based on a dehumidifying operation corresponding to the dehumidifying mode for dehumidifying a display of the at least one display that is a replacement display being completed, updating the at least one second bit included in the second calibration data included in the module data corresponding to the display identically as the at least one first bit.

The obtaining the dehumidifying mode for dehumidifying each display of the at least one display that is a replacement display may include obtaining manufacturing date data included in the module data corresponding to the display.

The obtaining the dehumidifying mode for dehumidifying each display of the at least one display that is a replacement display may include identifying a storage period for each display of the at least one display that is a replacement display based on a current date and the manufacturing date data included in the module data corresponding to the display, and obtaining a mode for each display of the at least one display that is a replacement display corresponding to the storage period for the display as the dehumidifying mode for the display.

The dehumidifying mode for each display of the at least one display that is a replacement display may be one dehumidifying mode from among a plurality of dehumidifying modes for the display, the plurality of dehumidifying modes for each display divided based on at least one predetermined period.

The controlling each display of the at least one display that is a replacement display to operate in the dehumidifying mode may include based on identifying that there is at least one display that is a replacement display, while a display of the at least one display is operating in the dehumidifying mode obtained for the display, deactivating at least one remaining display of the plurality of displays excluding the at least one display that is a replacement display.

The controlling each display of the at least one display that is a replacement display to operate in the dehumidifying mode may include controlling at least one remaining display of the plurality of displays excluding the at least one display that is a replacement display to display progress information of the dehumidifying mode of each display of the at least one display that is a replacement display.

BRIEF DESCRIPTION OF DRAWINGS

FIG. 7 is a diagram illustrating a dehumidifying mode according to one or more embodiments of the disclosure;

MODE FOR INVENTION

Figure 1:
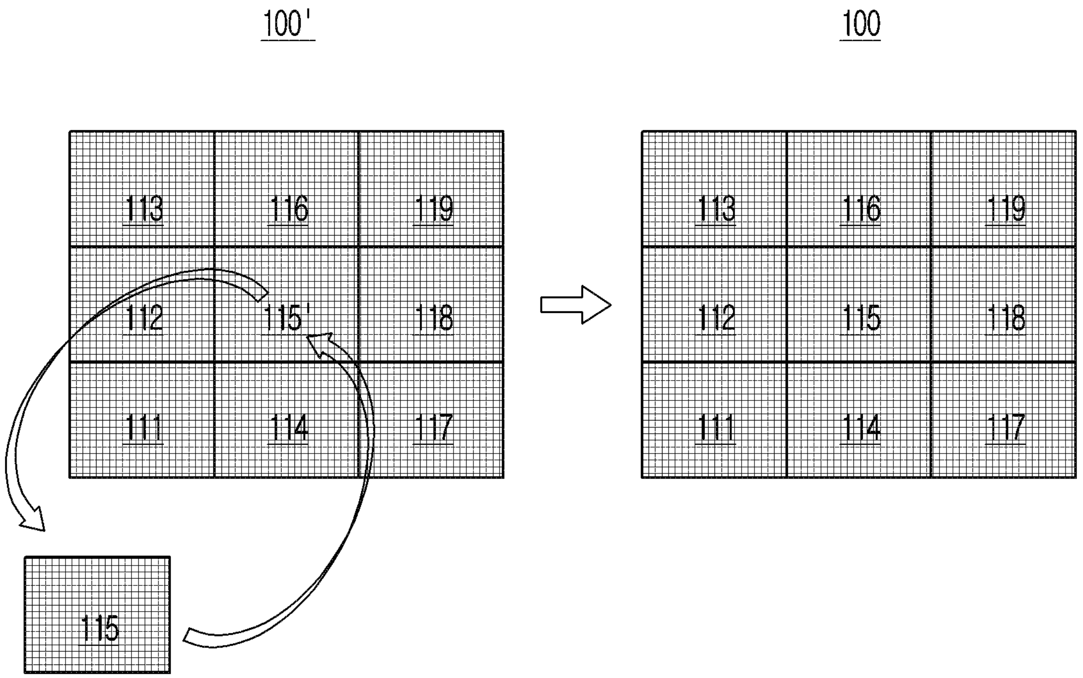
FIG. 1 is a diagram illustrating a display apparatus according to one or more embodiments of the disclosure.

Various modifications may be made to the embodiments of the disclosure, and there may be various types of embodiments. Accordingly, specific embodiments will be illustrated in drawings, and described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. With respect to the description of the drawings, like reference numerals may be used to indicate like elements.

In describing the disclosure, in case it is determined that the detailed description of related known technologies or configurations may unnecessarily confuse the gist of the disclosure, the detailed description thereof will be omitted.

Further, the embodiments below may be modified to various different forms, and it is to be understood that the scope of the technical spirit of the disclosure is not limited to the embodiments below. Rather, the embodiments are provided so that the disclosure will be thorough and complete, and to fully convey the technical spirit of the disclosure to those skilled in the art.

Terms used in the disclosure have been merely used to describe a specific embodiment, and is not intended to limit the scope of protection. A singular expression includes a plural expression, unless otherwise specified.

In the disclosure, expressions such as "have", "may have", "include", and "may include" are used to designate a presence of a corresponding characteristic (e.g., elements such as numerical value, function, operation, or component), and not to preclude a presence or a possibility of additional characteristics.

In the disclosure, expressions such as "A or B", "at least one of A and/or B", or "one or more of A and/or B" may include all possible combinations of the items listed together. For example, "A or B", "at least one of A and B", or "at least one of A or B" may refer to all cases including (1) at least one A, (2) at least one B, or (3) both of at least one A and at least one B.

Expressions such as "1st", "2nd", "first", or "second" used in the disclosure may limit various elements regardless of order and/or importance, and may be used merely to distinguish one element from another element and not limit the relevant element.

When a certain element (e.g., a first element) is indicated as being "(operatively or communicatively) coupled with/to" or "connected to" another element (e.g., a second element), it may be understood as the certain element being directly coupled with/to the another element or as being coupled through other element (e.g., a third element).

Conversely, when a certain element (e.g., first element) is indicated as "directly coupled with/to" or "directly connected to" another element (e.g., second element), it may be understood as the other element (e.g., third element) not being present between the certain element and the another element.

The expression "configured to . . . (or set up to)" used in the disclosure may be used interchangeably with, for example, "suitable for . . . ", "having the capacity to . . . ", "designed to . . . ", "adapted to . . . ", "made to . . . ", or "capable of . . . " based on circumstance. The term "configured to . . . (or set up to)" may not necessarily mean "specifically designed to" in terms of hardware.

Rather, in a certain circumstance, the expression "a device configured to . . . " may mean something that the device "may perform . . . " together with another device or components. For example, a phrase "a processor configured to (or set up to) perform A, B, or C" may mean a dedicated processor for performing a relevant operation (e.g., an embedded processor), or a generic-purpose processor (e.g., a central processing unit (CPU) or an application processor) capable of performing the relevant operations by executing one or more software programs stored in a memory device.

The term 'module' or 'part' used in one or more embodiments herein perform at least one function or operation, and may be implemented with a hardware or software, or implemented with a combination of hardware and software. In addition, a plurality of 'modules' or a plurality of 'parts', except for a 'module' or a 'part' which needs to be implemented with a specific hardware, may be integrated in at least one module and implemented as at least one processor.

Meanwhile, the various elements and areas of the drawings have been schematically illustrated. Accordingly, the technical spirit of the disclosure is not limited by relative sizes and distances illustrated in the accompanied drawings.

Embodiments of the disclosure will be described in detail with reference to the accompanying drawings to aid in the understanding of those of ordinary skill in the art.

FIG. 1 is a diagram illustrating a display apparatus according to one or more embodiments of the disclosure.

Referring to FIG. 1, a display apparatus 100 and a display apparatus 100' before display replacement are shown. The display apparatus 100 may include a plurality of displays 111-119.

Here, at least one from among the plurality of displays 111-119 may be replaced with another module. The display apparatus 100 may correspond to a display apparatus 100 in which one display 115' from among the plurality of displays 111, 112, 113, 114, 115', 116, 117, 118, and 119 included in the display apparatus 100' before replacement is replaced with another display 115. In the disclosure, the display apparatus 100 may be referred to as a 'display apparatus after replacement', a 'display apparatus after module replacement', a 'display apparatus after display replacement', or the like.

Here, the display apparatus 100 or the display apparatus 100' before display replacement may output an image received from an external device or content pre-stored in each display apparatus 100 and 100'. Here, the external device may be a separate content source, and correspond to a device that provides content to each display apparatus 100 and 100'. Then, the external device may be connected with each display apparatus 100 and 100' through an optical cable, an HDMI cable, or the like. The content source may be implemented as the above-described set top box, a smart phone, a television (TV), a personal computer (PC), a media box, and the like. However, the embodiment is not limited thereto.

Each display apparatus 100 and 100' may include a plurality of displays modules, and each of the plurality of display modules may include a plurality of LED devices. Here, the plurality of displays modules may be described as a 'plurality of displays' or a 'plurality of modules'. Specifically, each display 111-119, and 115' may be implemented as various forms such as, for example, and without limitation, a liquid crystal display (LCD), an organic light-emitting diode (OLED), Liquid Crystal on Silicon (LCoS), Digital Light Processing (DLP), a quantum dot (QD) display panel, a quantum dot light-emitting diodes (QLED), a Micro light-emitting diodes (uLED), a Mini LED, or the like.

Meanwhile, each of the plurality of displays 111-119, and 115' may be implemented as a touch screen coupled with a touch sensor, a flexible display, a rollable display, a 3D display, a display physically connected with a plurality of displays modules, and the like.

Meanwhile, each of the display apparatuses 100 and 100' may be substituted and referred to using various expressions that indicate a similar concept. For example, the display apparatus may be substituted in expression with a "display cabinet". Here, a cabinet may constitute one modular display apparatus by being assembled in plurality, and each cabinet may include a plurality of LED modules. In this case, each of the plurality of displays 111-119, and 115' described above may be implemented with LED modules.

Here, the modular display apparatus may be implemented as a TV, but is not limited thereto, and may be applicable without limitation to any device so long as it is a device with a display function such as, for example, and without limitation, a video wall, a large format display (LFD), a digital signage, a digital information display (DID), a projector display, and the like. Alternatively, the display apparatus 100 and 100' may not just be implemented as the various independent devices described above, but also implemented in a form of a display panel or a module applicable to the devices described above. Implementation examples such as display panels and the like applicable to the above-described device will be described in detail in the relevant part below.

In FIG. 1, an example of the display apparatus 100 and 100' being implemented as a display apparatus 100 and 100' of 3×3 size in which three displays are arranged in a horizontal direction and three displays are arranged in a vertical direction is shown, but a number, an arrangement direction, an arrangement position, form, and the like of the display apparatus 100 and 100' may be variously modified according to a purpose of use, location, and the like of the display apparatus 100 and 100'. Here, each of the plurality of displays 111-119, and 115' may be connected physically and electrically through a terminal and the like provided in each display 111-119, and 115'.

In this case, one from among the plurality of LED modules included in the display apparatus 100' before replacement may be replaced with a new LED module. At this time, the display apparatus 100 may be implemented with a cabinet including the new LED module.

However, each display apparatus 100 and 100' is not limited to being implemented as the cabinet as in the above-described example, and each of the display apparatuses 100 and 100' may be implemented as the display apparatus 100 and 100' including a plurality of cabinets. In this case, each of the plurality of displays 111-119, and 115' described above may be implemented as the cabinet including a plurality of LED modules. For example, one 115' from among the plurality of cabinets included in the display apparatus 100' before replacement may be replaced with a new cabinet. At this time, the display apparatus 100 may be implemented as a display apparatus 100 including the new cabinet.

However, the embodiment is not limited thereto, and even when each display apparatus 100 and 100' includes a plurality of cabinets, each of the plurality of displays 111-119, and 115' may be implemented with a plurality of LED modules. For example, one 115' from among the plurality of LED modules included in the cabinet of the display apparatus 100' before replacement may be replaced. At this time, the display apparatus 100 may be implemented as a display apparatus 100 including the new LED module.

In the disclosure, for convenience of description, it may be assumed that each display apparatus 100 and 100' is implemented with a cabinet including a plurality of LED modules as in the above-described example, and that one from among the plurality of LED modules included in the cabinet before replacement is replaced.

According to one or more embodiments, the display apparatus 100 may identify whether there is at least one display 115 replaced that is present before the display apparatus 100 is activated. At this time, if the replaced display 115 is identified as present, the display apparatus 100 may control for the replaced display 115 to be dehumidified by executing a dehumidifying mode based on module data corresponding to the replaced display. The detailed configuration of the display apparatus 100 that performs the above-described operation will be described in detail below.

Figure 2:
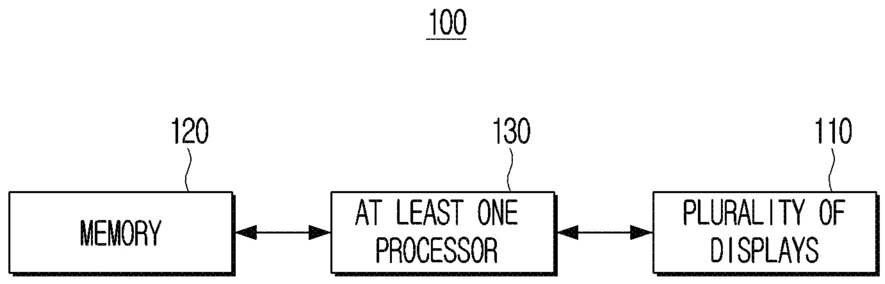
FIG. 2 is a block diagram illustrating a configuration of a display apparatus according to one or more embodiments of the disclosure.

FIG. 2 is a block diagram illustrating a configuration of a display apparatus according to one or more embodiments of the disclosure.

Referring to FIG. 2, the display apparatus 100 may include a plurality of displays 110, a memory 120, and at least one processor 130. In FIG. 2, although the display apparatus 100 has been shown as including only basic configurations (i.e., a display, a memory, and a processor), the display apparatus 100 may further include various configurations in addition to the above-described configurations.

The plurality of displays 110 may be a configuration for displaying various screens according to control of the at least one processor 130 of the display apparatus 100. The plurality of displays 110 may correspond to the plurality of displays 111-119 shown in FIG. 1. Here, because each of the plurality of displays 110 has been described in FIG. 1, redundant descriptions thereof will be omitted.

The memory 120 may be implemented in a form of a memory embedded in the display apparatus 100 according to a data storage use, or in a form of a memory attachable to and detachable from the display apparatus 100. For example, data for driving the display apparatus 100 may be stored in the memory embedded in the display apparatus 100, and data for an expansion function of the display apparatus 100 may be stored in the memory attachable to or detachable from the display apparatus 100. When implemented as the memory embedded in the display apparatus 100, the memory 120 may be at least one of a volatile memory (e.g., a dynamic random access memory (DRAM), a static RAM (SRAM), a synchronous dynamic RAM (SDRAM), etc.), or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard disk drive (HDD) or a solid state drive (SSD)). In the case of a memory attachable/detachable to the electronic apparatus 100, the memory may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

Meanwhile, in the example shown, the display apparatus 100 has been shown as being configured with one memory, but when distinguishing and referring to the volatile memory and the non-volatile memory, the display apparatus 100 may be referred to as including a plurality of memories.

The memory 120 according to one or more embodiments may store at least one instruction. Here, the at least one instruction may correspond to at least one instruction which causes the display apparatus 100 to identify whether a replaced display is present from among the plurality of displays 110 included in the display apparatus 100, and causes the replaced display to operate in the dehumidifying mode according to the dehumidifying mode for dehumidifying the replaced display. The memory 120 may store information necessary in operations of the display apparatus 100 in addition thereto.

According to one or more embodiments, the memory 120 may store initial setting data and module data for each of the plurality of displays 110.

Here, the memory 120 may include a plurality of flash memories, and each flash memory may be included in each of the plurality of displays 110. The above-described module data may be stored in a flash memory included in each of the plurality of displays 110. Here, the flash memory may correspond to a type of a non-volatile storage device, and may correspond to a storage device that can relatively read and write data faster than another storage device. Here, the non-volatile memory may mean a memory in which stored data is not erased even if power is turned-off.

For example, the flash memory may be included in each of the plurality of displays 110, and may store module data of each display 110, for example, and without limitation, calibration information, manufacturing date information, other various display setting values, and the like.

According to one or more embodiments, the at least one processor 130 may identify at least one replaced display from among the plurality of displays 110 using the initial setting data and the module data in the memory 120 (or flash memory). For example, the at least one processor 130 may identify the replaced display using calibration data recorded in a binary form included in each of the initial setting data and the module data. Detailed description thereof will be described in detail in FIG. 3.

The at least one processor 130 may perform an overall operation of the display apparatus 100. Specifically, the at least one processor 130 may function controlling the overall operation of the display apparatus 100.

The at least one processor 130 may be implemented as a digital signal processor (DSP) for processing a digital image signal, a microprocessor, a microprocessor, or a time controller (TCON). However, the embodiment is not limited thereto, and may include one or more from among a central processing unit (CPU), a micro controller unit (MCU), a micro processing unit (MPU), a controller, an application processor (AP), a graphics-processing unit (GPU), a communication processor (CP), or an ARM processor, or may be defined by a relevant term. In addition, the at least one processor 130 may be implemented as a System on Chip (SoC) or a large scale integration (LSI) in which a processing algorithm is embedded, and may be implemented in a form of a field programmable gate array (FPGA). In addition, the at least one processor 130 may perform various functions by executing computer executable instructions stored in the memory. The above will be described in detail in FIG. 8. Meanwhile, in FIG. 2, although the display apparatus 100 has been shown as including only one processor, at implementation, a plurality of processors (e.g., CPU+GPU, CPU+DSP) may be included.

According to one or more embodiments, the at least one processor 130 may control the display apparatus 100 by being connected with the plurality of displays 110 and the memory 120.

According to one or more embodiments, when the display apparatus 100 is activated, whether there is at least one display replaced that is present before the display apparatus is activated may be identified based on the initial setting data and pre-set module data for each of the plurality of displays 110 stored in the memory 120.

Here, the display apparatus 100 being activated may mean power being supplied to the display apparatus 100 which is turned-on (or booted), or being converted from a standby mode to a normal mode. At this time, the standby mode may mean a mode other than the normal mode in which the display apparatus 100 can normally output an image. For example, the standby mode may correspond to a mode corresponding to a standby state for replacing at least one display from among the plurality of displays 110. However, the display apparatus 100 being activated is not limited to the above-described example, and may mean an operation for the display apparatus 100 to be converted to a state for outputting in image normally.

Meanwhile, at least one from among the plurality of displays 110 included in the display apparatus 100 may correspond to the display that is replaced before the display apparatus 100 is activated. In this case, the display apparatus 100 may identify whether there is a display that is replaced present from among the plurality of displays 110. The display apparatus 100 may identify whether there is the display replaced that is present based on the initial setting data and the pre-set module data for each of the plurality of displays 110 stored in the memory (or flash memory included in the memory). For example, the pre-set module data may correspond to data set through an initial setting process (e.g., a calibration process) in a manufacturing step or an initial use step of the display apparatus 100.

In an example, the at least one processor 130 may compare the initial setting data with module data corresponding to each of the plurality of displays 110, identify, based on identifying that module data corresponding to the at least one display from among the module data corresponding to each of the plurality of displays 110 is different from the initial setting data, the at least one display as the at least one replaced display, and identify the at least one replaced display as present. Here, the operation of the at least one processor 130 comparing the initial setting data and the module data will be described in detail below in FIG. 3.

Here, the initial setting data and the module data corresponding to each of the plurality of displays 110 may include calibration data for correcting at least one parameter corresponding to each of the plurality of displays 110. The at least one processor 130 may compare first calibration data included in the initial setting data with second calibration data corresponding to each of the plurality of displays 110, and identify, based on second calibration data corresponding to at least one display from among the second calibration data corresponding to each of the plurality of displays 110 being different from the first calibration data, the at least one display as the at least one replaced display. The above will be described in detail below in FIG. 3.

In an example, each of the first calibration data and the second calibration data may include a plurality of bits, the first calibration data may include at least one first bit set to identify whether the display is replaced, and the second calibration data may include at least one second bit positioned at a same bit position as the at least one first bit. At this time, the at least one processor 130 may compare the at least one first bit with the at least one second bit, and identify, based on the at least one first bit and the at least one second bit being identified as different, at least one display corresponding to the at least one second bit as the at least one replaced display. The above will be described in detail below in FIG. 4.

Meanwhile, the at least one processor 130 may update, based on a dehumidifying operation corresponding to the dehumidifying mode being completed, the at least one second bit corresponding to the at least one display completed with the dehumidifying operation identically as the at least one first bit. The above will be described in detail below in FIG. 5.

According to one or more embodiments, the at least one processor may obtain, based on the at least one replaced display being identified as present, the dehumidifying mode for dehumidifying the at least one replaced display based on module data corresponding to the at least one replaced display.

Here, the module data corresponding to the replaced display may correspond to module data stored in the flash memory of the display identified as replaced. Specifically, the at least one processor 130 may obtain, after identifying at least one display having module data different from the initial setting data, the dehumidifying mode based on the module data corresponding to the relevant display.

Here, dehumidifying may mean an operation for removing moisture of a replaced display. At this time, operating in the dehumidifying mode may be an operation for driving the replaced display to an extent appropriate for preventing or removing moisture penetration. For example, the operating in the dehumidifying mode may mean performing an operation for applying an electric signal (a form of current or voltage) with a certain magnitude for each of the at least one replaced display or LEDs included in the display. The display operating in the dehumidifying mode may maintain a black screen, or display a screen of another single color (e.g., a blue screen). Here, maintaining the black screen may mean that the at least one processor 130 is blocking an image signal from remaining displays excluding the replaced display, and may mean blocking power supplied to the remaining displays. However, the embodiment is not limited thereto, and the display apparatus 100 may display an image indicating a dehumidifying state.

In an example, the at least one processor 130 may obtain, based on the at least one replaced display being identified as present, the dehumidifying mode for dehumidifying the at least one replaced display based on manufacturing date data included in the module data corresponding to the at least one replaced display. The above will be described in detail below in FIG. 6.

At this time, the at least one processor 130 may identify a storage period based on current date and manufacturing date data stored in the memory 120, and obtain a mode corresponding to the storage period as the dehumidifying mode.

Here, the dehumidifying mode may be one from among a plurality of dehumidifying modes divided based on at least one predetermined period. The at least one processor 130 may obtain the dehumidifying mode by comparing the storage period with the at least one predetermined period. The above will be described in detail below in FIG. 7.

According to one or more embodiments, the at least one replaced display may be controlled to operate in the obtained dehumidifying mode. Here, the operating in the dehumidifying mode may mean that the at least one processor applies an electric signal (e.g., current or voltage) of a certain size for the replaced display or LED.

At this time, the at least one processor 130 may deactivate, based on the at least one replaced display being identified as present, at least one of the remaining displays excluding the at least one replaced display from among the plurality of displays 110 while operating in the dehumidifying mode. The above will be described in detail below in FIG. 9.

In an example, the at least one processor 130 may control the at least one remaining display excluding the at least one replaced display from among the plurality of displays 110 to display a screen including progress information of the dehumidifying mode. The above will be described in detail below in FIG. 10.

Figure 3:
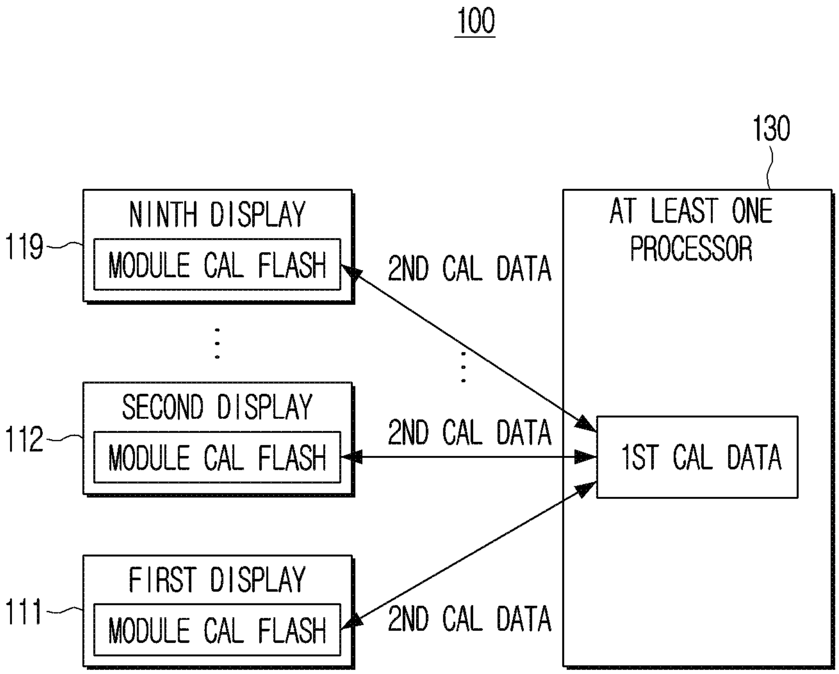
FIG. 3 is a diagram illustrating module data according to one or more embodiments of the disclosure.

FIG. 3 is a diagram illustrating module data according to one or more embodiments of the disclosure.

Referring to FIG. 3, a first display to a ninth display 111-119 are shown. The at least one processor 130 may compare the second calibration data (2nd Cal data) with the first calibration data (1st Cal data) of each of the first display to ninth display 111-119.

Here, the first calibration data and the second calibration data may correspond to data included in the initial setting data and the module data, respectively. The first calibration data and the second calibration data may include values which can change according to initial setting, and the like.

According to one or more embodiments, when the display apparatus 100 is activated, the at least one processor 130 may compare the initial setting data with the module data corresponding to each of the plurality of displays 111-119. Further, the at least one processor 130 may identify that module data corresponding to the at least one display from among the module data corresponding to each of the plurality of displays 111-119 is different from the initial setting data. Then, the at least one processor 130 may identify that at least one replaced display is present.

Specifically, the initial setting data may include an initial setting value associated with an operation of the display apparatus 100. The initial setting value described may be adjusted by a manufacturer or a user in a manufacturing step or an initial use step and stored in the memory 120.

Meanwhile, the module data may include various information (e.g., brightness, color, contrast ratio, a product number, manufacturing date information, etc.) associated with each of the plurality of displays 111-119. The module data may include values adjusted to respectively match each of the plurality of displays 111-119, respectively, by initial setting. That is, the module data before initial setting is carried out may be different for each of the plurality of displays 111-119, respectively. Here, the flash memory (Module Cal Flash) provided in each of the plurality of displays 111-119 may store module data of each of the plurality of displays 111-119.

Meanwhile, an existing display that was not replaced from among the plurality of displays 111-119 included in the display apparatus 100 may include data which matches with the above-described initial setting data. This is because the initial setting data including a value initially set may be stored after the module data for the plurality of displays being assembled together is initially set during the manufacturing step, and the like of the display apparatus 100.

Conversely, if the plurality of displays 111-119 include at least one replaced display, the flash memory of the replaced display may also store module data, but the module data corresponding to the replaced display may not match with the above-described initial setting data.

Accordingly, the at least one processor 130 may compare the initial setting data with the module data of each of the plurality of displays 111-119, and identify whether there is at least one replaced display that is present from among the plurality of displays 111-119.

According to one or more embodiments, the initial setting data and the module data for each of the plurality of displays 110 may include calibration data. Here, the calibration data may correspond to data for correcting at least one parameter corresponding to each of the plurality of displays 111-119. That is, the calibration data may mean a plurality of values for the plurality of displays 111-119 that constitute the display apparatus 100 to exhibit optimal performance. For example, the calibration data may correspond to data for maintaining a consistent screen quality by adjusting color, brightness, contrast ratio, and the like of a screen displayed by each of the plurality of displays 111-119. Here, calibration may mean a process of adjusting the above-described color, brightness, contrast ratio, and the like.

According to one or more embodiments, the at least one processor 130 may compare the first calibration data included in the initial setting data with second calibration data corresponding to each of the plurality of displays. Then, the at least one processor 130 may identify, based on second calibration data corresponding to at least one display from among the second calibration data corresponding to each of the plurality of displays 111-119 being identified as different from the first calibration data, the at least one display as the at least one replaced display.

At this time, an existing display that was not replaced from among the plurality of displays 111-119 included in the display apparatus 100 may include data that matches with the first calibration data. This is because the second calibration data is corrected through a calibration process, and the corrected calibration value is stored as a first calibration value in the manufacturing step, and the like of the display apparatus 100.

Conversely, if the plurality of displays 111-119 includes at least one replaced display, the flash memory of the replaced display may also store the second calibration data. In this case, the second calibration data corresponding to the replaced display may not match with the above-described initial setting data.

Accordingly, the at least one processor 130 may compare the first calibration data with the second calibration data of each of the plurality of displays 111-119, and identify whether there is at least one replaced display that is present from among the plurality of displays 111-119.

If the at least one processor 130 reads the respective second calibration data of the plurality of displays 111-119, and there is second calibration data that is not a match with the first calibration data, at least one display corresponding to the relevant second calibration data may be identified as the replaced display. Accordingly, the at least one processor 130 may identify that a replaced display is present through a data comparison process.

Meanwhile, each of the above-described calibration data may correspond to data that is recordable as numbers. A detailed description will be provided below.

Figure 4:
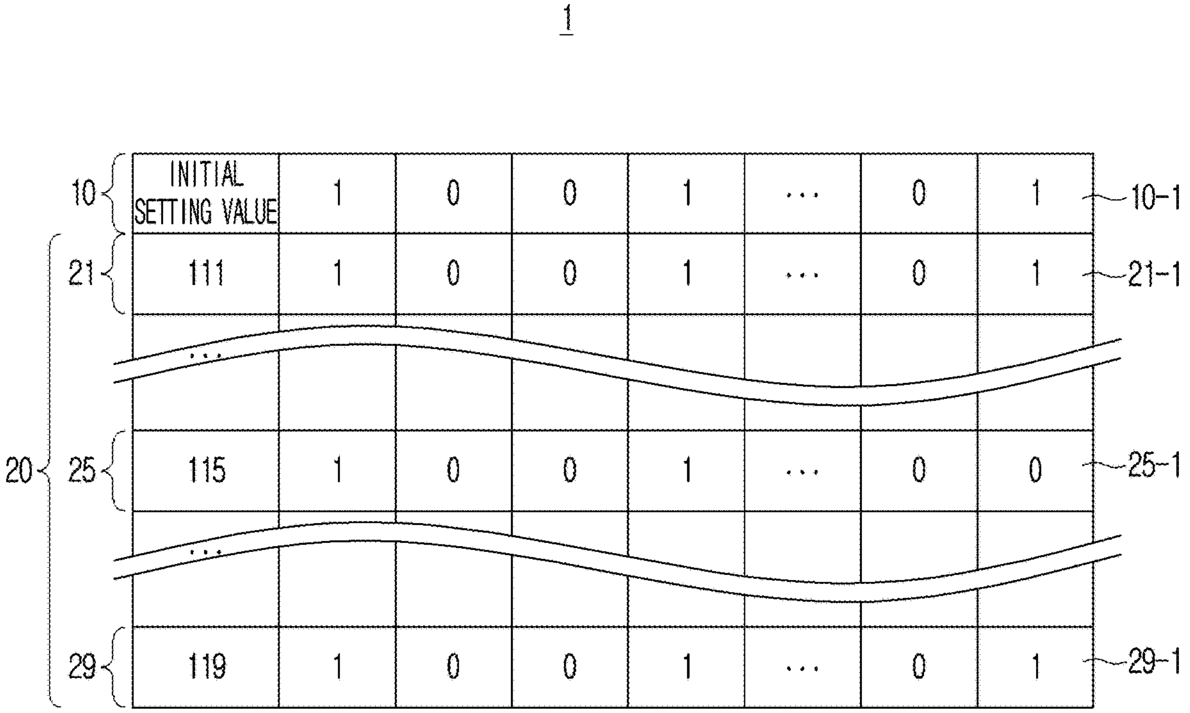
FIG. 4 is a diagram illustrating a plurality of bits according to one or more embodiments of the disclosure.
Figure 5:
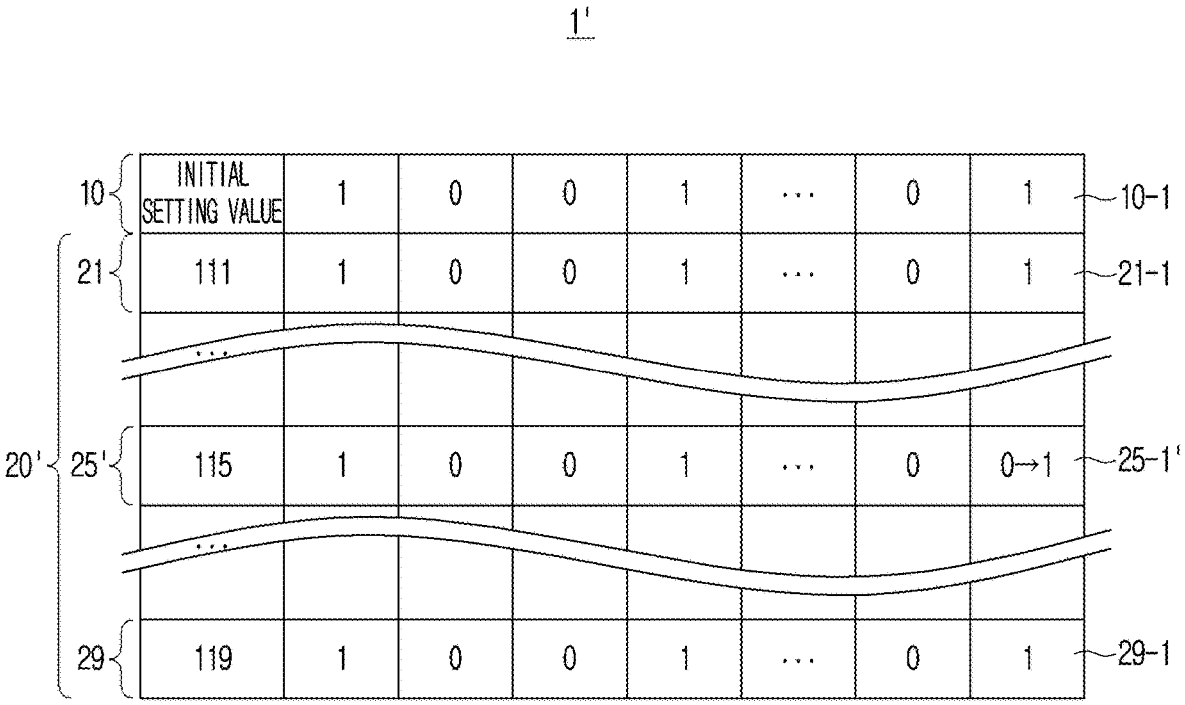
FIG. 5 is a diagram illustrating a plurality of bits according to one or more embodiments of the disclosure.

FIG. 4 and FIG. 5 are diagrams illustrating a plurality of bits according to one or more embodiments of the disclosure.

Referring to FIG. 4, Table 1 may include initial setting data 10 and second calibration data 20 corresponding to each of the plurality of displays 111-119, the initial setting data 10 may include a plurality of bits including a first bit 10-1, and the second calibration data 20 may include a plurality of bits including second bits 21-1-29-1. The second calibration data 20 may include second calibration data 21-29 corresponding to each of the plurality of displays 111-119. Here, the initial setting value may be included in the above-described initial setting data 10, and may be described as first calibration data 10. That is, Table 1 may correspond to a table in which the first calibration data 10 and the second calibration data 20 are arranged for each bit position. Here, the bit position may mean a position of a bit in a binary number.

According to one or more embodiments, the first calibration data 10 and the second calibration data 20 may include a plurality of bits, respectively, the first calibration data 10 may include at least one first bit 10-1 set to identify whether a display is replaced, and the second calibration data 20 may include at least one second bit positioned at a same bit position as the at least one first bit 10-1.

For example, through the calibration process in the manufacturing step, or the like, the first calibration data 10 and the second calibration data 20 may be identically set. In the calibration process described above, a manufacturer or the like may set for a specific bit position to have a specific value in order to identify whether there is a module replacement in the future. Here, the specific bit position may correspond to bit positions of each of the first bit and the second bit described above.

Specifically, the manufacturer or the like may set for specific bits 10-1, 21-1-21-9 included in each of the first calibration data 10 and the second calibration data 20 to all have the same value (e.g., 1 from among 0 or 1). The example of FIG. 4 may correspond to an example of the manufacturer or the like setting least significant bits (LSB) of the second calibration data 20 to each have a value of 1 in the manufacturing step of the display apparatus 100. In this case, the first bit and the second bit may correspond to LSB in the first calibration data 10 and the second calibration data 20, respectively.

At this time, in the remaining bits excluding the LSB of the second calibration data 20, a setting value (e.g., brightness, color, contrast ratio, etc.) according to calibration may be input. Then, the first calibration data 10 may be stored including initial setting information of the second calibration data 20. Here, the initial setting information may include corrected setting value and the like in case calibration is carried out for each of the plurality of displays 111-119. That is, the first calibration data 10 may include a setting value set in the manufacturing step (or an initial step) and information about an initial setting bit (e.g., 1) for identifying whether a display is replaced.

Meanwhile, after the manufacturing step of the display apparatus 100, it may be necessary to replace a portion of the displays due to aging or failure in a use step, or the like. At this time, the user may replace the portion of the displays from among existing plurality of displays included in the display apparatus 100 with new displays. Here, a new display may correspond to a display for replacement which was manufactured separately from the displays assembled together during the manufacturing step or the like of the display apparatus 100. Here, the display for replacement may be referred to as a ‘service module’, a ‘service display’, or the like.

For example, in a manufacturing step of the display for replacement, the manufacturer or the like may likewise input calibration data in even a flash memory of the display for replacement. Here, the calibration data may correspond to the above-described second calibration data. At this time, the manufacturer or the like may input a specific value (e.g., 0) in the second bit for the display apparatus 10 to automatically identify whether a display is replaced when the display for replacement is used to replace a display of the display apparatus 100 in the future. That is, when 1 is set as the second bit for an existing display of the display apparatus 100, 0 may be set at the second bit in corresponding manufacturing step with respect to the display for replacement.

In this case, when the initial setting value (e.g., brightness, color, contrast ratio, etc.) is set through the calibration process for even the display for replacement in the future, remaining of the plurality of bits excluding the second bit may match with a bit corresponding to the existing display. However, because the second bit of the replaced display and the second bit of the existing display are different from each other, the display apparatus 100 may identify whether a display is replaced by comparing each of the second bits with each other.

According to one or more embodiments, the display apparatus 100 may identify, based on the at least one first bit 10-1 and at least one second bit 25-1 being identified as different by comparing the at least one first bit 10-1 with the at least one second bits 21-1-29-1, at least one display 115 corresponding to the at least one second bit 25-1 as at least one replaced display 115.

In an example, when the display apparatus 100 is activated, the display apparatus 100 may compare the first bit 10-1 from among the first calibration data 10 with the second bits 21-1-29-1 of the second calibration data 20, respectively. For example, if the first bit is stored as 1, second calibration data 25 in which the second bit 25-1 is 0 may be identified. At this time, the display 115 corresponding to the second calibration data 25 in which the second bit 25-1 is 0 may be identified as the replaced display.

For example, if each of the displays 111-119 is implemented as an LED module including a plurality of LED devices and the LED module is replaced, the display apparatus 100 may identify a module in which the second bit is 0 after reading the second calibration data 25 from the flash memory of each LED module when the display apparatus 100 is implemented as an apparatus including one cabinet constituted with a plurality of LED modules. The display apparatus 100 may perform, in this case, the dehumidifying operation for a replaced LED module by identifying a relevant LED module as the replaced module.

Through the above, the display apparatus 100 may effectively identify whether a display is replaced using the calibration data stored in each of the displays 111-119.

Meanwhile, when each of the displays 111-119 is implemented as a plurality of cabinets including a plurality of LED modules, respectively, the display apparatus 100 may identify a cabinet in which the second bit is 0 after reading the second calibration data 25 from a flash memory provided for each respective cabinets. The display apparatus 100 may perform, in this case, the dehumidifying operation for a replaced cabinet by identifying a relevant cabinet as the replaced cabinet.

Meanwhile, when each of the displays 111-119 is implemented as cabinets respectively, the display apparatus 100 may perform a similar operation even when one module from among the plurality of LED modules included in each cabinet is replaced. For example, the display apparatus 100 may perform, when a portion of the LED modules are replaced, the dehumidifying operation for the replaced LED module through the second calibration data 25 from the flash memory provided for each LED module, respectively. At this time, the display apparatus 100 may perform the dehumidifying operation for only the replaced LED module, and perform the dehumidifying operation for the cabinet as a whole in which the relevant LED module belongs. Through the above, performance of the display apparatus 100 may be more stabilized by removing moisture from even LED modules in the surrounding of the replaced LED.

Meanwhile, according to the above-described example, although each of the first bit 10-1 and second bits 21-1-29-1 have been described as corresponding to one bit (e.g., LSB), the embodiment is not limited thereto. In an example, each of the first calibration data 10 and the second calibration data 20 may include a plurality of first bits and a plurality of second bits. That is, unlike the example of FIG. 4, (0, 1) at the furthest right side from the first calibration data 10 may be set as the plurality of first bits, and (0, 1) or (0, 0) at the furthest right side from the second calibration data 20 may be set as the plurality of second bits. In this case, the remaining bits excluding the two bits at the furthest right side may be stored with the corrected setting value (e.g., brightness, color, contrast ratio, etc.) through the calibration process.

As described, when the plurality of first bits and the plurality of second bits are set, an error of the display apparatus 100 wrongly identifying whether a replaced display is present may be effectively prevented compared to when a single first bit 10-1 and second bits 21-1-29-1 are set.

For example, when the single first bit 10-1 and second bits 21-1-29-1 are set in the first calibration data 10 and the second calibration data 20, a problem as described below may occur. In the manufacturing step of the display 115 for replacement, the second bit which needs to be set as 0 may be wrongly set as 1. When the display 115 for replacement is mounted to the display apparatus 100, the display apparatus 100 may not identify the replaced display 115 as a replaced display.

The plurality of first bits and the plurality of second bits may be set in the first calibration data 10 and the second calibration data 20, and if the plurality of first bits is (0, 1), even when the LSB is wrongly set as 1 with respect to the display 115 for replacement as in the above-described example, an error may occur only when even a bit left of the LSB is wrongly set as 0. That is, if the plurality of first bits and second bits are set, because an error occurs only when both the plurality of second bits and the plurality of first bits are all a match, an occurrence rate of errors may be lowered.

According to one or more embodiments, the display apparatus 100 may obtain, based on module data corresponding to the display 115 identified as having been replaced, the dehumidifying mode for dehumidifying the replaced display 115, and control the replaced display 115 to operate in the obtained dehumidifying mode.

Referring to FIG. 5, Table 1' shows second calibration data 25' corresponding to the replaced display 115 from among second calibration data 20'. Here, a second bit 25-1' of the second calibration data 25' may be replaced from 0 to 1. The initial setting value (first calibration data) 10 may correspond to a value same as a value in Table 1 shown in FIG. 4. In addition, remaining bits excluding a second bit 25-1' corresponding to the replaced display 115 from among the first bit 10-1 and second bits 21-1-29-1 may also correspond to a bit same as a bit in Table 1 shown in FIG. 4.

According to one or more embodiments, the display apparatus 100 may update, based on the dehumidifying operation corresponding to the dehumidifying mode being completed, the at least one second bit 25-1 corresponding to the at least one display 115 completed with the dehumidifying operation identically as the at least one first bit 10-1. At this time, the display apparatus 100 may update the second bit 25-1 to 1, and set 1 as the updated second bit 25-1'.

Accordingly, second calibration data 21-24, 25', and 26-29 corresponding to each of the plurality of displays 111-119 including the replaced display 115 may all match.

Meanwhile, even when at least one display from among the plurality of displays 111-119 is then replaced with a new display, the display apparatus 100 may identify whether the display is replaced by identifying a display having a second bit of 0 through a comparison of calibration data.

Meanwhile, as described above, the first calibration data 10 and the second calibration data 20 may include the plurality of first bits and the plurality of second bits, respectively. In this case, the display apparatus 100 may input data associated with replacement history in each of the plurality of first bits and the plurality of second bits. For example, when two bits to the furthest right from the first calibration data 10 and the second calibration data 20 are set as the plurality of first bits and the plurality of second bits, respectively, the furthest right bit (LSB) may be set as a bit for identifying whether there is replacement. At this time, a left bit from the furthest right bit may be set as a bit for inputting data associated with the replacement history.

For example, if dehumidifying of the display 115 identified as replaced is completed, the display apparatus 100 may update the LSB corresponding to the replaced display 115 to 1, and input 1 for a left bit from the LSB. Here, the input 1 may mean that the dehumidified display 115 corresponds to the replaced display.

Through the above, if a migration failure occurs with respect to the replaced display 115 in the future, the display apparatus 100 may easily identify the display 115 with the replacement history and may be of assistance in solving a migration problem. Here, the migration failure may mean a problem which may occur when a new display is added or replaced. For example, a problem associated with a physical connection of the display and a software compatibility problem may be included, and a problem associated with the above-described calibration may be included. When the migration problem described above occurs, the display apparatus 100 may solve the problem through resetting or the like of the display 115 with the replacement history.

Meanwhile, the display apparatus 100 may obtain, after identifying whether a replaced display is present through module data (calibration data), the dehumidifying mode based on module data of the replaced display 115. The display apparatus 100 may use other data in addition to the calibration data included in the module data in order to obtain the dehumidifying mode.

Figure 6:
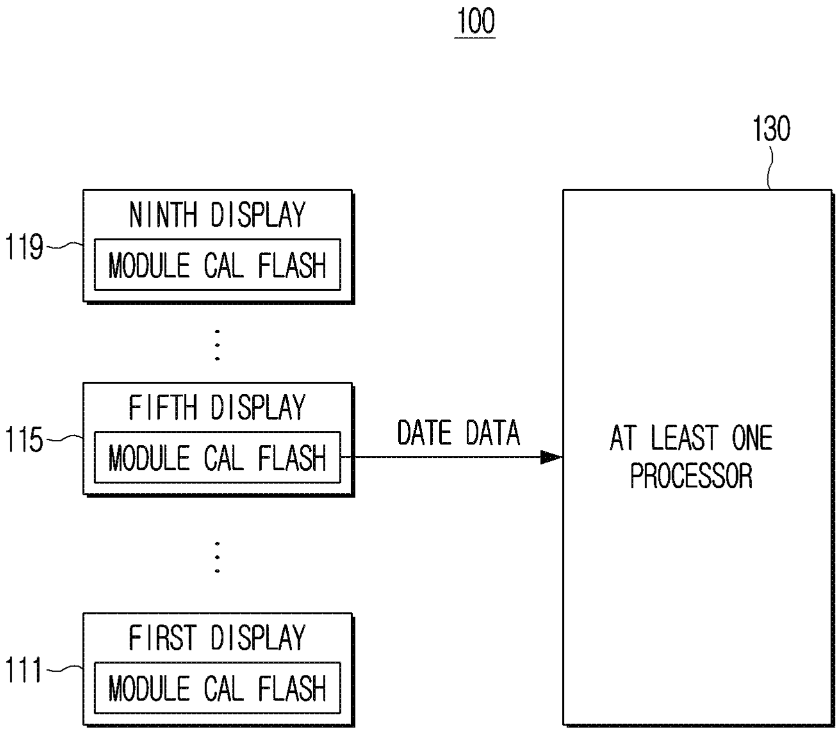
FIG. 6 is a diagram illustrating manufacturing date data according to one or more embodiments of the disclosure.

FIG. 6 is a diagram illustrating manufacturing date data according to one or more embodiments of the disclosure.

Referring to FIG. 6, the at least one processor 130 may read date data stored in a flash memory (Module Cal Flash) of a fifth display 115 from among a first display 111 to a ninth display 119. Here, the flash memory may correspond to a storage medium which stores the above-described calibration data. The flash memory may store module data corresponding to each of the plurality of displays 111-119. For example, the flash memory may store date data together with the calibration data.

Here, the date data may include information about a date associated with each of the plurality of displays 111-119. For example, the date data may include manufacturing date data including date information at which each of the plurality of displays 111-119 is manufactured. Alternatively, the date data may include information about a term of valid use of the plurality of displays 111-119. Here, the term of valid use may mean a period range during which each of the plurality of displays 111-119 is mounted to the display apparatus 100 and the like and can normally perform an image display function. However, the embodiment is not limited thereto.

According to one or more embodiments, the at least one processor 130 may obtain, based on at least one replaced display 115 being identified as present, the dehumidifying mode for dehumidifying the at least one replaced display based on the manufacturing date data included in the module data corresponding to the at least one replaced display 115.

In an example, the at least one processor 130 may identify the at least one replaced display 115 based on the initial setting data and the module data as described above. At this time, the at least one processor 130 may identify the manufacturing date data included in the module data corresponding to the at least one replaced display 115. Here, the manufacturing date data may include information about a manufactured date (year/month/day) at which each of the plurality of displays 111-119 is manufactured. Here, the date may be recorded as a plurality of bits expressed in binary form, and the plurality of bits with respect to a manufacturing date may be stored separately from the second calibration data in the flash memory described above.

Specifically, the at least one processor 130 may compare the above-described first calibration data and second calibration data, identify the at least one display having the second bit which is different from the first bit, and identify the at least one display as a replaced display.

For example, referring to FIG. 4, the at least one processor 130 may identify the second calibration data 25 in which the second bit 25-1 is 0 rather than 1 from among the second calibration data. At this time, referring back to FIG. 6, the at least one processor 130 may identify the manufacturing date data stored together with the second calibration data 25 described above in the flash memory.

Meanwhile, the at least one processor 130 may obtain the dehumidifying mode for dehumidifying the at least one replaced display 115 based on the identified manufacturing date data.

Specifically, the at least one processor 130 may calculate a storage date of the at least one replaced display 115 by using the manufacturing date data.

According to one or more embodiments, the at least one processor 130 may identify the storage period based on the current date and the manufacturing date data stored in the memory, and obtain a mode corresponding to the storage period as the dehumidifying mode.

In an example, the memory may store the current date. At this time, the memory may store a system clock which provides the current date and time, and the at least one processor 130 may identify the current date using the system clock stored in the memory.

Then, the at least one processor 130 may identify the storage period based on the current date and the manufacturing date data stored in the memory. For example, the at least one processor 130 may calculate an elapse period from a manufacturing date corresponding to the manufacturing date data to the current date. Here, the elapse period may be expressed in a unit of at least one from among year, month, day, hour, minute, and second. For example, if the current date stored in the memory is Jul. 1, 2024, and the manufacturing date is Aug. 1, 2019, the at least one processor 130 may calculate a period of 4 years and 11 months by calculating from Aug. 1, 2019, to Jul. 1, 2024. The at least one processor 130 may identify the 4 years and 11 months as the storage period. In another example, if the current date stored in the memory is Jul. 1, 2024, and the manufacturing date is Jun. 1, 2019, the at least one processor 130 may calculate the storage period as 5 years and 1 month.

Meanwhile, the at least one processor 130 may obtain a mode corresponding to the identified storage period as the dehumidifying mode. Here, the mode may correspond to an operation mode for dehumidifying the at least one replaced display 115.

For example, if the portion of the displays of the display apparatus 100 are replaced with new displays (or replaced displays), the new displays may have absorbed a significant amount of moisture according to an environment of a storage, or the like when stored for a long period in the storage, or the like. In this case, the replaced displays may have to carry out dehumidifying in the dehumidifying mode at a relatively high intensity. Conversely, if new displays are stored in the storage, or the like for a relatively short period, the new displays may have absorbed a relatively small amount of moisture. In this case, the replaced displays may have to quickly carry out dehumidifying in the dehumidifying mode of a relatively low intensity.

In an example, the at least one processor 130 may obtain a mode in which dehumidifying is carried out for a long time in proportion to the storage period as the dehumidifying mode. Alternatively, the at least one processor 130 may obtain a mode in which high brightness is maintained for a longer time in proportion to the storage period as the dehumidifying mode. Alternatively, the at least one processor 130 may obtain a mode including many dehumidifying operation steps in proportion to the storage period as the dehumidifying mode. However, the embodiment is not limited thereto.

In the example described above, the at least one processor 130 may calculate a dehumidifying time, a time during which high brightness is maintained, or a number of dehumidifying operations using the storage period.

Here, the dehumidifying operation steps may include at least one pre-heating step and at least one aging pattern step.

Here, the pre-heating step may correspond to a step for evaporating moisture by slowly heating the inside of the at least one replaced display 115. For example, the at least one processor 130 may control for the at least one replaced display 115 to output images from a low brightness to a high brightness progressively.

Meanwhile, the aging pattern step may correspond to a step for repeatedly outputting a specific pattern for a certain time with respect to the at least one replaced display 115. Here, the specific pattern may include full-white and black. For example, the at least one processor 130 may control the at least one replaced display 115 to output a screen for a certain time in full-white, and display a black screen after a certain time has elapsed, and perform the step as described above repeatedly. For example, the at least one processor 130 may continue the pre-heating step longer as the storage period is longer, and repeatedly output the full-white and black screens several more times.

Meanwhile, the at least one processor 130 may obtain one from among several dehumidifying modes by comparing the storage period with a specific period.

FIG. 7 is a diagram illustrating a dehumidifying mode according to one or more embodiments of the disclosure.

Referring to FIG. 7, Table 2 shows the dehumidifying mode according to the storage period and the dehumidifying operation.

According to one or more embodiments, the dehumidifying mode may be one from among a plurality of dehumidifying modes divided based on at least one determined period, and the display apparatus 100 may obtain the dehumidifying mode by comparing the storage period with the at least one determined period.

Here, the at least one determined period may correspond to a determined period for dividing the plurality of dehumidifying modes. Here, the determined period may be stored in the memory according to setting by the user or the manufacturer, and may be reset into various periods different from a previous period even after being stored in the memory.

Meanwhile, the plurality of dehumidifying modes may be divided based on the above-described determined period. For example, if a determined period is 5 years, the plurality of dehumidifying modes may include a first mode corresponding to when the storage period is less than 5 years and a second mode corresponding to when the storage period is 5 years or more, and the first mode and the second mode may be divided based on 5 years which is the determined period.

Specifically, the first mode and the second mode may include at least one pre-heating step and aging pattern step, respectively.

For example, the first mode may include a 10-step pre-heating step and 120-hour aging pattern step. Each pre-heating step may be a step for outputting images from a low brightness to a high brightness. In the pre-heating step, the replaced display may be progressively heated by gradually outputting images of high brightness after having output images of low brightness. The 120-hour aging pattern step included in the first mode may be a step for outputting the full-white and black screens. For example, in the aging pattern step, the replaced display may employ as a basic unit operation an operation for outputting the full-white screen for 2 hours and then, outputting the black screen for 1 hour, and carry out the above-described basic unit operation repeatedly 40 times. The display replaced in the aging pattern step as described above may perform the dehumidifying operation in the aging pattern step of a total of 120 hours.

Meanwhile, the second mode may include an 11-step pre-heating step and a 120-hour aging pattern step. Here, the 120-hour aging pattern step may be identical as the first mode. However, the embodiment is not limited thereto, and in the second mode, an aging pattern mode may be performed for a longer time (e.g., 150 hours) unlike the first mode. For example, the replaced display may carry out the above-described basic unit operation repeatedly 50 times in the second mode.

Meanwhile, the replaced display may further add, in the second mode, one step in addition to the 10-step pre-heating step included in the first mode and an 11-step pre-heating mode may be performed.

Through the above, the display apparatus 100 may set the dehumidifying mode by comparing the storage period with a pre-set period (or a reference period) based on the identified storage period. Accordingly, because the display apparatus 100 can automatically perform a suitable dehumidifying operation according to a storage period for storing the replaced display, user convenience may be increased.

Meanwhile, the above-described determined period may be set in a plurality of periods. For example, the user or the manufacturer may set the plurality of periods different from one another as the determined period. That is, unlike that as shown in FIG. 7, the user or the manufacturer may set the determined period as 2 years and 5 years.

In this case, the plurality of dehumidifying modes may correspond to a plurality of modes divided into a plurality of determined periods (2 years, 5 years). For example, the display apparatus 100 may operate in the first mode if the storage period of the replaced display is less than 2 years, operate in the second mode if the storage period is 2 years or more and less than 5 years, and operate in a third mode if the storage period is 5 years or more. Like when the determined period is one period, the first mode to the third mode may correspond to modes in which the pre-heating step and the aging pattern step are each set differently according to the storage period. However, the embodiment is not limited thereto.

Accordingly, because the determined period may be variously set into the plurality of periods, the user or the manufacturer may set the mode in greater detail according to environmental conditions at which the replaced display was stored or the stored period, and have the replaced display to be more effectively dehumidified.

Meanwhile, the display apparatus 100 may obtain, after identifying whether there is replacement of the display as described above, the dehumidifying mode based on the storage period of the replaced display, and operate according to the obtained dehumidifying mode, and to this end, the at least one processor included in the display apparatus 100 may perform several data processing processes.

Figure 8:
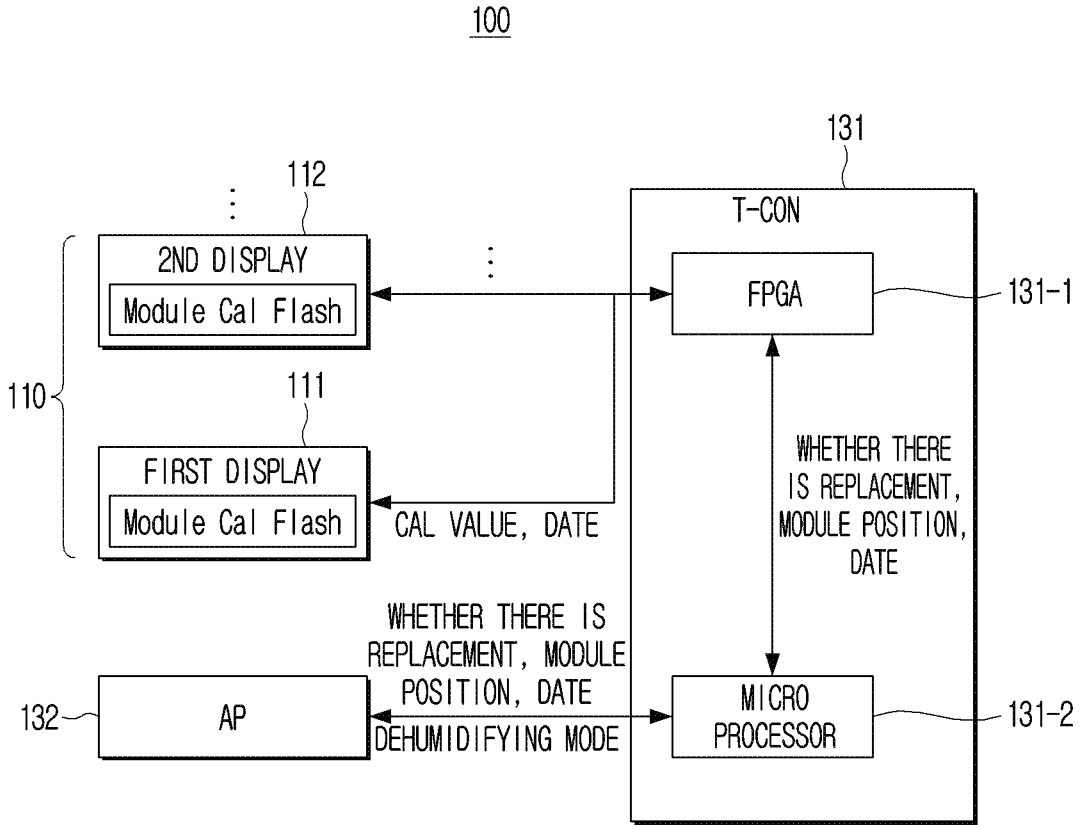
FIG. 8 is a diagram illustrating at least one processor according to one or more embodiments of the disclosure.

FIG. 8 is a diagram illustrating at least one processor according to one or more embodiments of the disclosure.

Referring to FIG. 8, the at least one processor may include a timing controller (T-CON) 131 and an application processor (AP) 132. Here, the T-CON 131 may include a field-programmable gate array (FPGA) 131-1 and a microprocessor 131-2.

Here, the T-CON 131 may perform a role of controlling time at which a signal is provided to the plurality of displays 110. Specifically, the plurality of displays 110 may convert an input image signal to a signal for displaying an image and the signal may be transferred according to a suitable time. However, the embodiment is not limited thereto, and data necessary in an operation of the display apparatus 100 may be read from the flash memory in each of the plurality of displays 111-119, and data provided from an external processor device may be recorded in the flash memory. However, the embodiment is not limited thereto, and data necessary in an operation of the display apparatus 100 may be read from the flash memory and the like of each of the plurality of displays 111-119, and data provided from the external processor device may be recorded in the flash memory.

Specifically, the T-CON 131 may include the FPGA 131-1 and the microprocessor 131-2. Here, the FPGA 131-1 may correspond to a semiconductor device in which a programmable internal circuit is included. Meanwhile, the microprocessor 131-2 may correspond to single integrated circuit for mainly performing various computation functions for digital signals. For example, the FPGA 131-1 may be electrically connected with the plurality of displays 111-119. In addition, the FPGA 131-1 may be programmed for the display apparatus 100 to perform an operation necessary for carrying out the dehumidifying mode for the at least one replaced display, and may include circuitry designed according to the above-described programming. The microprocessor 131-2 may transmit and receive digital signals with the FPGA 131-1 and perform an operation for the display apparatus 100 to perform the dehumidifying mode for the at least one replaced display.

Meanwhile, the AP 132 may be positioned on a mainboard of the display apparatus 100 and receive digital signals from the microprocessor 131-2. The AP 132 may perform computations for the digital signals received from the microprocessor 131-2 and provide signals necessary in an operation of the display apparatus 100 to the microprocessor 131-2. Although FIG. 8 shows an example of the at least one processor being configured with one T-CON 131 and one AP 132, this is merely one example, and a plurality of T-CONs 131 and a plurality of APs 132 may configure the processor and perform an operation necessary in an operation of the display apparatus 100.

Accordingly, the processors of various types (FPGA 131-1, microprocessor 131-2, AP 132) included in the at least one processor may operate organically and control an operation of the display apparatus 100. However, the embodiment is not limited thereto.

For example, when the display apparatus 100 is activated, the FPGA 131-1 may read the calibration data from the flash memory of each of the plurality of displays 111-119. Then, the FPGA 131-1 may identify a specific bit (second bit) value for recognizing replacement of the at least one display, and identify whether at least one display is replaced by comparing with a bit (first bit) according to the initial setting.

If the second bit from among the calibration data read by the FPGA 131-1 is identical as with the bit according to the initial setting, the display apparatus 100 may operate in the normal mode. Conversely, if the second bit from among the calibration data read by the FPGA 131-1 is different from the bit according to the initial setting, date data may be read from the flash memory of the at least one display corresponding to the second bit described above.

Then, the FPGA 131-1 may provide data on whether the at least one display is replaced, position data of the replaced display, and date data to the microprocessor 131-2. The microprocessor 131-2 may provide the received data to the AP 132 positioned at the mainboard. Here, the position data may be data which is identifiable by the FPGA 131-1. The FPGA 131-1 may identify position data from the calibration data having the second bit that is different from a bit according to the initial setting data. For example, as shown in FIG. 1, when the display 115 in row 2 and column 2 corresponds to the replaced display from among the plurality of displays 111-119 in a 3×3 array, the FPGA 131-1 may identify position data including information that the replaced display 115 is arranged in row 2 and column 2 from the calibration data having the second bit that is different from the bit according to the initial setting data. The position data may correspond to data expressed in the binary form like the calibration data.

Next, the AP 132 may process data received from the microprocessor 131-2. Specifically, the AP 132 may determine, based on receiving the data described above, as having to execute the dehumidifying mode rather than the normal mode, and identify the storage period for executing which dehumidifying mode. The AP 132 may calculate a total storage period after comparing the manufacturing date data of the replaced display with the current date. Then, the AP may have a dehumidifying mode pattern that matches a condition (e.g., a storage period condition, etc.) executed for only the replaced display through the position data of the replaced display. When progress of the dehumidifying mode is completed, the microprocessor 131-2 of the T-CON 131 may transfer a control signal to the FPGA 131-1, and have the FPGA 131-1 update a bit (second bit) for recognizing a replacement of the display from 0 to 1 in the flash memory of the replaced display.

The operations of the T-CON 131 and the AP 132 have been described in detail above, but the embodiment is not limited thereto, and the T-CON 131 and the AP 132 may perform various operations necessary for the display apparatus 100 to dehumidify the replaced display, in addition to the operations of the display apparatus 100 described herein.

Figure 9:
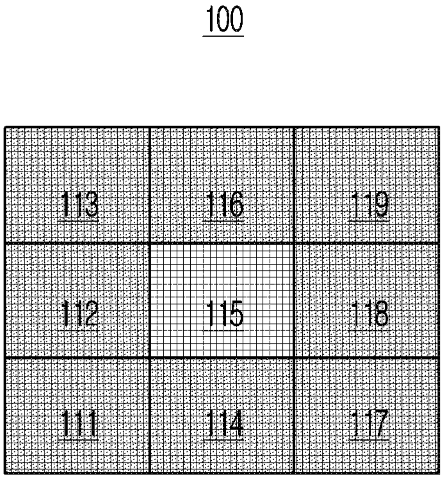
FIG. 9 is a diagram illustrating a deactivation operation according to one or more embodiments of the disclosure.

FIG. 9 is a diagram illustrating a deactivation operation according to one or more embodiments of the disclosure.

Referring to FIG. 9, the remaining of the plurality of displays 111-114, and 116-119 excluding the replaced display 115 from among the plurality of displays 111-119 included in the display apparatus 100 may be in a dark state.

According to one or more embodiments, the display apparatus 100 may deactivate, based on the at least one replaced display 115 being identified as present, at least one of the remaining displays 111-114, and 116-119 excluding the at least one replaced display 115 from among the plurality of displays 111-119 while operating in the dehumidifying mode.

Here, the display apparatus 100 deactivating the at least one of the remaining displays 111-114, and 116-119 may mean controlling the at least one of the remaining displays 111-114, and 116-119 to display a screen of a dark state (e.g., black screen), or mean blocking an image signal for the at least one of the remaining displays 111-114, and 116-119, or mean blocking power supplied to the at least one of the remaining displays 111-114, and 116-119.

Based on the at least one replaced display 115 being present, the display apparatus 100 may have an effect of reducing power consumption by executing the dehumidifying mode for only the replaced display 115 by maintaining the at least one of the remaining displays 111-114, and 116-119 in the deactivated state.

Meanwhile, the display apparatus 100 may display a notification screen notifying to the user a state of progress of the dehumidifying mode while the dehumidifying mode is being executed with respect to the replaced display 115.

Figure 10:
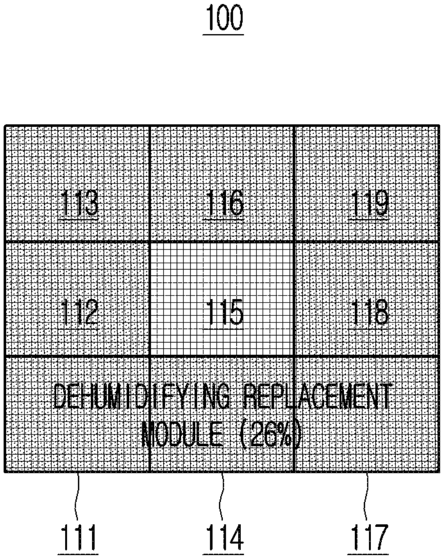
FIG. 10 is a diagram illustrating an operation in which progress information is displayed according to one or more embodiments of the disclosure.

FIG. 10 is a diagram illustrating an operation in which progress information is displayed according to one or more embodiments of the disclosure.

Referring to FIG. 10, when the display apparatus 100 is operating in the dehumidifying mode with respect to the replaced display 115, a text of 'dehumidifying replacement module (26%)' may be displayed at the lower displays 111, 114, and 117 from among the remaining plurality of displays 111-114, and 116-119.

According to one or more embodiments, the display apparatus 100 may control the at least one of the remaining displays 111-114, and 116-119 excluding the at least one replaced display 115 from among the plurality of displays 111-119 to display a screen including dehumidifying mode progress information.

Here, the dehumidifying mode progress information may include information that the dehumidifying mode is being automatically executed by the display apparatus 100 for the replaced display because a replaced display is present from among the plurality of displays 111-119, and information about a progress development according to the above-described dehumidifying mode or information about a position of the display in which dehumidifying is in progress. Here, the information about a progress development may be displayed as time remaining until dehumidifying of the replaced display 115 is completed overall or a progress rate (%). Here, the time remaining or the progress rate may be calculated based on humidity. That is, the display apparatus 100 may sense humidity in the replaced display 115 in real-time through at least one sensor included separately in the display apparatus 100, and calculate the time remaining or the progress rate based on an initial humidity directly after replacing the display 115.

Meanwhile, although FIG. 10 shows an example of the text 'dehumidifying replacement module (26%)' being displayed as the dehumidifying mode progress information, this is merely one example. Various texts, photographs, moving images, and the like including information that the dehumidifying mode is in progress may be displayed, and various texts and the like including information indicating the position of the display in which dehumidifying is in progress may be displayed.

For example, the display apparatus 100 may control, based on the dehumidifying mode being executed for the replaced display 115, the lower displays 111, 114, and 117 from among the remaining plurality of displays 111-114, and 116-119 to display the dehumidifying mode progress information. At this time, the display apparatus 100 may deactivate the plurality of displays 112, 113, 116, 118, and 119 excluding the lower displays 111, 114, and 117 at which the progress information is displayed from among the remaining plurality of displays 111-114, and 116-119.

Meanwhile, although FIG. 10 shows a state in which the progress information is displayed at the lower displays 111, 114, and 117, but this is merely one example, and the progress information may be displayed at various positions from among the remaining plurality of displays 111-114, and 116-119. In addition, the progress information may be displayed at one of the remaining plurality of displays 111-114, and 116-119, or displayed at a plurality of displays from among the remaining plurality of displays 111-114, and 116-119. In addition, the progress information may be displayed moving positions according to time within the range of the remaining plurality of displays 111-114, and 116-119.

Figure 11:
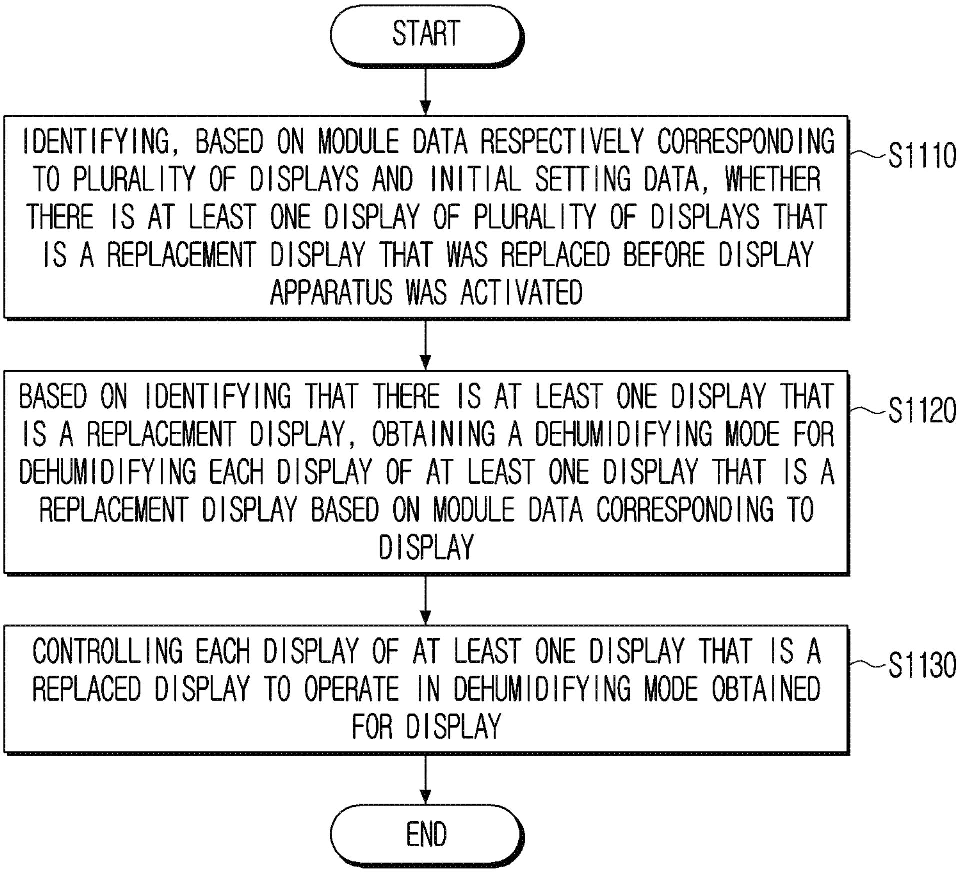
FIG. 11 is a flowchart illustrating a controlling method of a display apparatus according to one or more embodiments of the disclosure.

FIG. 11 is a flowchart illustrating a controlling method of a display apparatus according to one or more embodiments of the disclosure.

Referring to FIG. 11, the display apparatus 100 may identify, when the display apparatus is activated, whether there is at least one replaced display that is present before the display apparatus is activated from among the plurality of displays based on the initial setting data and the pre-set module data for each of the plurality of displays (S1110).

According to one or more embodiments, the display apparatus 100 may compare the initial setting data with the module data corresponding to each of the plurality of displays, and identify, based on module data corresponding to at least one display from among the module data corresponding to each of the plurality of displays being identified as different from the initial setting data, the at least one display as the at least one replaced display, and identify that the at least one replaced display is present.

Then, when the at least one replaced display is identified as present, obtain the dehumidifying mode for dehumidifying the at least one replaced display based on module data corresponding to the at least one replaced display (S1120).

According to one or more embodiments, the display apparatus 100 may obtain, based on the at least one replaced display being identified as present, the dehumidifying mode for dehumidifying the at least one replaced display based on manufacturing date data included in the module data corresponding to the at least one replaced display.

According to one or more embodiments, the display apparatus 100 may identify a storage period based on the current date and the manufacturing date data, and obtain a mode corresponding to the storage period as the dehumidifying mode.

Then, the at least one replaced display may be controlled to operate in the obtained dehumidifying mode (S1130).

According to one or more embodiments, the display apparatus 100 may deactivate, based on the at least one replaced display being identified as present, at least one of the remaining displays excluding the at least one replaced display from among the plurality of displays while operating in the dehumidifying mode.

Through the above, if failure occurs, while using the display apparatus 100, in a portion of the displays which are to be replaced with long term stored displays, the replaced display may be automatically recognized and then, the dehumidifying mode corresponding to the replaced display may be automatically operated. Accordingly, when replacing a portion of the displays, a worker or the like directly turning-on the display apparatus by mistake without moisture being removed may be prevented, and problems such screen overheating, a defective LED occurring as a result thereof, and the like may be prevented. In addition, inconvenience by the worker having to manually execute the dehumidifying mode may be reduced, and convenience may be increased by executing a dehumidifying mode that automatically recognizes the storage period of the display and matches the condition.

The various methods described in FIG. 11 may be performed by the display apparatus having the configuration as shown in FIG. 2, but is not necessarily limited thereto, and may be performed by a display apparatus having various configurations.

Meanwhile, in FIG. 11, an order of all steps have been mapped for convenience of description, but it should be noted that the steps may not be related to an order or that the order of the steps performable in parallel may not be necessarily limited to the relevant order.

Meanwhile, methods according to at least a portion from among the various embodiments of the disclosure described above may be implemented in an application form installable in display apparatuses of the related art.

In addition, the methods according to at least a portion from among the various embodiments of the disclosure described above may be implemented with only a software upgrade, or a hardware upgrade with respect to the display apparatuses of the related art.

In addition, the methods according to at least a portion from among the various embodiments of the disclosure described above may be performed through an embedded server provided in the display apparatus, or at least one external server from among the display apparatuses.

Meanwhile, according to an embodiment of the disclosure, the various embodiments described above may be implemented with software including instructions stored in a machine-readable storage media (e.g., computer). The machine may call an instruction stored in a storage medium, and as an apparatus operable according to the called instruction, may include the display apparatus (e.g., display apparatus (A)) according to the above-mentioned embodiments. Based on the instruction being executed by the processor, the processor may directly or using other elements under the control of the processor perform a function corresponding to the instruction. The instruction may include a code generated by a compiler or executed by an interpreter. A machine-readable storage medium may be provided in a form of a non-transitory storage medium. Herein, 'non-transitory' merely means that the storage medium is tangible and does not include a signal, and the term does not differentiate data being semi-permanently stored or being temporarily stored in the storage medium. For example, the 'non-transitory storage medium' may include a buffer in which data is temporarily stored. According to an embodiment, a method according to the various embodiments described above may be provided included a computer program product. The computer program product may be exchanged between a seller and a purchaser as a commodity. The computer program product may be distributed in a form of the machine-readable storage medium (e.g., a compact disc read only memory (CD-ROM)), or distributed (e.g., downloaded or uploaded) online through an application store (e.g., PLAYSTORE™) or directly between two user devices (e.g., smartphones). In the case of online distribution, at least a portion of the computer program product (e.g., downloadable app) may be stored at least temporarily in the machine-readable storage medium such as a server of a manufacturer, a server of an application store, or a memory of a relay server, or temporarily generated.

While the disclosure has been illustrated and described with reference to example embodiments thereof, it will be understood that the embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display apparatus, comprising:

a plurality of displays;

a memory storing at least one instruction; and at least one processor configured to execute the at least one instruction stored in the memory to:

identify, based on comparing initial setting data with module data respectively corresponding to each display of the plurality of displays, whether there is at least one display of the plurality of displays that is a replacement display that was replaced before the display apparatus was activated, based on identifying that there is at least one display that is a replacement display, obtain a dehumidifying mode for dehumidifying each display of the at least one display that is a replacement display based on the module data corresponding to the display, and control each display of the at least one display that is a replacement display to operate in the dehumidifying mode obtained for the display.

2. The display apparatus of claim 1, wherein the at least one processor is configured to:

identify module data corresponding to at least one display of the plurality of displays that is different from the initial setting data, and identify the at least one display having corresponding module data that is different from the initial setting data as the at least one display that is a replacement display.

3. The display apparatus of claim 2, wherein the initial setting data includes first calibration data for correcting at least one parameter corresponding to each of the plurality of displays, the module data corresponding to each display of the plurality of displays includes second calibration data for correcting the at least one parameter, and the at least one processor is configured to:

compare the first calibration data with the second calibration data included in the module data corresponding to each display of the plurality of displays, identify second calibration data included in the module data corresponding to at least one display of the plurality of displays as different from the first calibration data, and identify the at least one display having corresponding module data including second calibration data that is different from the first calibration data as the at least one display that is a replacement display.

4. The display apparatus of claim 3, wherein the first calibration data includes a plurality of bits, and the plurality of bits included in the first calibration data includes at least one first bit to identify whether a display is a replacement display, the second calibration data included in the module data corresponding to each display of the plurality of displays includes a plurality of bits, and the plurality of bits included in the second calibration data includes at least one second bit positioned at a same bit position as the at least one first bit, and the at least one processor is configured to:

compare the at least one first bit with the at least one second bit included in the second calibration data included in the module data corresponding to each display of the plurality of displays, identify the at least one first bit and the at least one second bit included in the second calibration data included in the module data corresponding to at least one display of the plurality of displays as being different, and identify the at least one display having corresponding module data including second calibration data including the at least one second bit that is different than the at least one first bit as the at least one display that is a replacement display.

5. The display apparatus of claim 4, wherein the at least one processor is configured to based on a dehumidifying operation corresponding to the dehumidifying mode for dehumidifying a display of the at least one display that is a replacement display being completed, update the at least one second bit included in the second calibration data included in the module data corresponding to the display identically as the at least one first bit.

6. The display apparatus of claim 1, wherein the at least one processor is configured to based on identifying that there is at least one display that is a replacement display, obtain the dehumidifying mode for dehumidifying each display of the at least one display that is a replacement display based on manufacturing date data included in the module data corresponding to the display.

7. The display apparatus of claim 6, wherein the at least one processor is configured to identify a storage period for each display of the at least one display that is a replacement display based on a current date and the manufacturing date data included in the module data corresponding to the display, and obtain a mode for each display of the at least one display that is a replacement display corresponding to the storage period for the display as the dehumidifying mode for the display.

8. The display apparatus of claim 7, wherein the dehumidifying mode for each display of the at least one display that is a replacement display is one dehumidifying mode from among a plurality of dehumidifying modes for the display, the plurality of dehumidifying modes for each display divided based on at least one predetermined period, and the at least one processor is configured to obtain the dehumidifying mode for each display of the at least one display that is a replacement display by comparing the storage period for the display with the at least one predetermined period.

9. The display apparatus of claim 1, wherein the at least one processor is configured to based on identifying that there is at least one display that is a replacement display, while a display of the at least one display is operating in the dehumidifying mode obtained for the display, deactivate at least one remaining display of the plurality of displays excluding the at least one display that is a replacement display.

10. The display apparatus of claim 1, wherein the at least one processor is configured to control at least one remaining display of the plurality of displays excluding the at least one display that is a replacement display to display progress information of the dehumidifying mode of each display of the at least one display that is a replacement display.

11. A controlling method of a display apparatus including a plurality of displays, the controlling method comprising:

identifying, based on comparing initial setting data with module data respectively corresponding to each display of the plurality of displays, whether there is at least one display of the plurality of displays that is a replacement display that was replaced before the display apparatus was activated;

based on identifying that there is at least one display that is a replacement display, obtaining a dehumidifying mode for dehumidifying each display of the at least one display that is a replacement display based on module data corresponding to the display; and controlling each display of the at least one display that is a replaced display to operate in the dehumidifying mode obtained for the display.

12. The controlling method of claim 11, wherein the identifying whether there is at least one display of the plurality of displays that is a replacement display that was replaced before the display apparatus is activated includes identifying module data corresponding to at least one display of the plurality of displays that is different from the initial setting data; and identifying the at least one display having corresponding module data that is different from the initial setting data as the at least one display that is a replacement display.

13. The controlling method of claim 12, wherein the initial setting data includes first calibration data for correcting at least one parameter corresponding to each of the plurality of displays, the module data corresponding to each display of the plurality of displays includes second calibration data for correcting the at least one parameter corresponding to each display of the plurality of displays, and the identifying the at least one display having corresponding module data that is different from the initial setting data as the at least one display that is a replacement display includes:

comparing the first calibration data with second calibration data included in the module data corresponding to each display of the plurality of displays, identifying second calibration data included in the module data corresponding to at least one display of the plurality of displays as different from the first calibration data, and identifying the at least one display having corresponding module data including second calibration data that is different from the first calibration data as the at least one display that is a replacement display.

14. The controlling method of claim 13, wherein the first calibration data includes a plurality of bits, and the plurality of bits included in the first calibration data includes at least one first bit to identify whether a display is a replacement display, the second calibration data included in the module data corresponding to each display of the plurality of displays includes a plurality of bits, and the plurality of bits included in the second calibration data includes at least one second bit positioned at a same bit position as the at least one first bit, and the identifying the at least one display having corresponding module data including second calibration data that is different from the first calibration data as the at least one display that is a replacement display includes:

comparing the at least one first bit with the at least one second bit included in the second calibration data included in the module data corresponding to each display of the plurality of displays, identifying the at least one first bit and the at least one second bit included in the second calibration data included in the module data corresponding to at least one display of the plurality of displays as being different, and identifying the at least one display having corresponding module data including second calibration data including the at least one second bit that is different than the at least one first bit as the at least one display that is a replacement display.

15. The controlling method of claim 14, further comprising:

based on a dehumidifying operation corresponding to the dehumidifying mode for dehumidifying a display of the at least one display that is a replacement display being completed, updating the at least one second bit included in the second calibration data included in the module data corresponding to the display identically as the at least one first bit.

* * * * *